H. J. RYAN.
METHOD OF AND MEANS FOR MEASURING POWER IN ELECTRIC CIRCUITS.
APPLICATION FILED NOV. 8, 1910.
1,069,187. Patented Aug. 5, 1913.
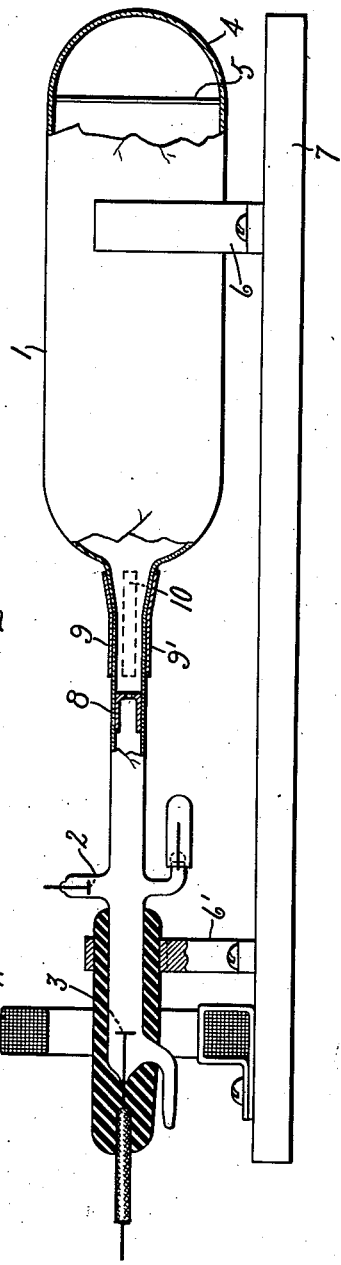
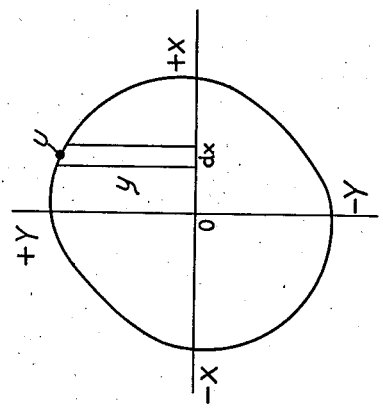
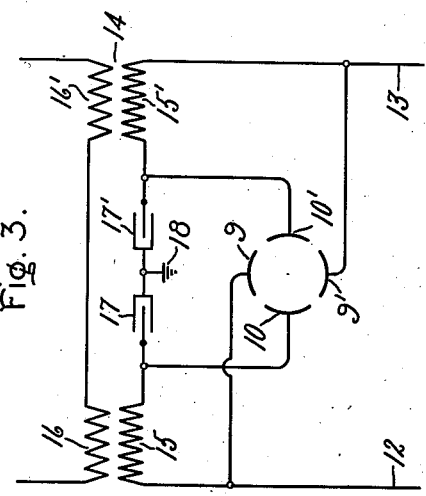
Witnesses:
Earl G. Klock
J. Ellis Glen
Inventor:
Harris J. Ryan,
by Albert G. Davis
His Attorney.

UNITED STATES PATENT OFFICE.

HARRIS J. RYAN, OF PALO ALTO, CALIFORNIA, ASSIGNOR TO GENERAL ELECTRIC COMPANY, A CORPORATION OF NEW YORK.

METHOD OF AND MEANS FOR MEASURING POWER IN ELECTRIC CIRCUITS.

1,069,187.  Specification of Letters Patent.  Patented Aug. 5, 1913.

Application filed November 8, 1910. Serial No. 591,302.

*To all whom it may concern:*

Be it known that I, HARRIS J. RYAN, a citizen of the United States, residing at Palo Alto, in the county of Santa Clara, State of California, have invented certain new and useful Improvements in Methods of and Means for Measuring Power in Electric Circuits, of which the following is a specification.

My invention relates to the measurement or indication of electric power and has for its object an improved method and means for accomplishing this purpose.

More specifically, my invention relates to the measurement or indication of small power consumptions in alternating electric circuits of high voltages. Methods and instruments of sufficient sensitiveness for the measurement of small powers in low voltage circuits are well known. The measurement or indication of a small power consumption in a high voltage circuit has been up to the present a difficult one and the object of my invention is to provide a new method and means which shall be simple, accurate, and well adapted for this purpose.

I accomplish the object of my invention by obtaining, as an indication of the power in an electric circuit, an inclosed curve or diagram which has the properties that its coordinates in one direction are proportional to the voltage in the circuit and its coördinates in another direction, preferably at right angles to the first direction, are proportional to the quantity of electricity in the circuit. The area of this curve or diagram will then be proportional to the power in the circuit, and, by measuring this area, the amount of power can be determined. I obtain this curve or diagram preferably by causing an indicator such as a pencil of cathode rays to be displaced simultaneously in two directions, preferably at right angles to each other. The indicator or pencil of rays is so influenced by electric fields that its displacement in one direction is proportional to the voltage of the circuit whose power consumption is to be measured, and the velocity of displacement in the second direction is proportional to the instantaneous current in the circuit. The indicator or pencil of rays will then trace or form a curve or diagram upon a suitable screen provided for this purpose, and, from the area of this diagram, the power in the circuit may be computed. Farther on in this specification I have described at length what I believe to be the correct theory underlying my invention.

The further novelties of my invention are described with more particularity in the appended claims.

For a further understanding of my invention, reference may be had to the accompanying drawing, where—

Figure 1 shows a vertical view, partly in section, of the instrument which I employ; Fig. 2 is a diagram illustrating the principle underlying my invention, and Fig. 3 is a diagram of the connections which I employ.

Referring first to Fig. 1, 1 is a hermetically sealed tube, from which the air is exhausted so as to produce a vacuum of high degree. In this tube are mounted two plates, 2 and 3. The tube is formed at one end with a bulb 4 in which is mounted a screen 5. The tube is mounted upon supports 6 and 6′ attached to any suitable base 7. Between the screen 5 and the plates 2 and 3 is a diaphragm 8 pierced to allow a pencil of cathode rays to pass through it upon the screen 5 and cause a luminous spot to appear thereon.

The tube which I have described is the well known Braun tube and is similar to that shown in my prior Patent No. 834,998 and in Patent No. 838,273, R. Rankin. I shall not, therefore, further describe the construction of this tube, as such forms no portion of my invention.

Between the screen 5 and the diaphragm 8 are plates or quadrants 9, 9′ and 10, 10′ of a conducting material, which plates are connected to the circuit to be tested, so as to subject the pencil of rays to two electrostatic fields. The connections for producing these fields will be described more fully with reference to Fig. 3. Surrounding the small end of the tube is the coil 11 which is used for focusing the ray in the manner described in Patent No. 838,273.

Referring now to Fig. 2, the principle upon which my invention operates is diagrammatically shown. Let it be assumed that this figure represents the curve or diagram traced by the pencil of cathode rays or pointer *u* upon the screen, the pencil being subjected to the influence of two electrostatic fields in quadrature. The X and Y axes are drawn in the usual manner. I arrange the fields so that the vertical displacement of the pointer $y$ is proportional to the instantaneous value of the electromotive force $e$ between the conductors of the circuit whose power is to be measured. The horizontal velocity of the pointer $$\frac{dx}{dt}$$

is proportional to the corresponding instantaneous current $i$. Thus $$y = e$$
$$\frac{dx}{dt} = i \text{ or } dx = idt$$

Multiplying $$ydx = eidt = dW = \text{energy increment}$$

Or $$ydx = dA = \text{area increment}$$

Therefore $$dA = dW$$

Integrating $$\int dA = \int dW$$

Or $$A = W$$

It follows, therefore, that for a constant frequency in the circuit the area of the path traced by the pencil of rays or pointer is a measure of the electrical power, and, by suitably calibrating the instrument, this power can be computed from a measurement of this area. The expression "$idt$" will be recognized as representing the differential of the quantity of electricity in the circuit, and hence it may be stated that the coördinates of the curve or diagram are respectively proportional to the voltage and the quantity of electricity in the circuit.

In order that the pencil of rays may be displaced in the manner mentioned above, I subject it to the influence of two electrostatic fields displaced by an angle preferably of ninety degrees from each other and represented by the plates or quadrants 9, 9′ and 10, 10′, see Figs. 1 and 3. One of these sets of quadrants is connected to the circuit in such a manner that the electrostatic field which it produces is proportional to the voltage of the circuit whose power is to be measured and the other set of quadrants is connected across condensers which I shall term "velocity condensers" in series with the circuit, so that the horizontal velocity of the pointer, due to the action of the field, set up by this second set of quadrants is proportional to this instantaneous value of the current, or the differential of the horizontal displacement of the pointer is proportional to the product of the current by the differential of time.

It will be understood, that while I have described a preferred means for obtaining the power diagram, I do not limit myself to this means, as my method is applicable to other means for obtaining this diagram if the coördinates of the curve forming the same follow the law enunciated above.

Referring now to Fig. 3, I show a scheme of connections for producing the electrostatic fields influencing the pencil of cathode rays in the manner which I have described above. 12 and 13 are conductors of the circuit whose power is to be measured. This circuit is supplied from a suitable source of energy, such as transformer 14, and I have shown this transformer as having two secondary windings 15, 15′ connected in series and energized by two primary windings 16, 16′, also connected in series and supplied from a suitable source which is not shown. It will be obvious that other forms of connection may be used. Connected in series between the two windings 15, 15′, I have shown the two velocity condensers 17, 17′, the conductor joining these two condensers being connected to ground 18. I use this ground connection between the two condensers as I have found that for the best results the middle values of the displacement and velocity pressures should have a common zero potential. As will be seen by an inspection of the drawing, the quadrants 9, 9′ are connected across the circuit and quadrants 10, 10′ are connected across the condensers. Quadrants 9, 9′ will, therefore, set up an electrostatic field proportional to the voltage of the circuit. Quadrants 10, 10′, which are preferably placed as shown so as to be displaced ninety degrees from quadrants 9, 9′ are connected across the condensers, so that the differential of the electrostatic field produced by them will be proportional to the product of the current by the differential of time, or, as explained above, the velocity of the pointer in the direction in which it is influenced by the action of the electrostatic field produced by the conductors 10, 10′ will be proportional to the instantaneous value of the current.

When the anode and cathode plates of the tube are connected to a suitable Holz or Wimshurst machine in the usual manner, as explained in the patents previously referred to, and I have not considered it necessary to illustrate this connection as it forms no portion of my invention, so that a pencil of cathode rays is set up, this pencil of rays will be influenced in the manner which I have described and trace upon the screen a curve or diagram which will be of the character shown in Fig. 2. The shape of the diagram, however, as will be well understood, will depend entirely upon the properties of the circuit whose power is to be measured. The path of the pencil of rays or pointer upon the screen may be suitably recorded by photography or by hand tracing in any of the well known ways, and I have not illustrated this as it forms no portion of my invention. The area of this diagram or the area inclosed by this path may be measured, and, after the instrument has been suitably calibrated, the power in the circuit may be computed from this area.

The underlying method or principle upon which my invention rests is to influence an indicator or pointer such as the pencil of cathode rays so that it will have a displacement in one direction proportional to the voltage of the circuit to be measured and will have a velocity in the other direction proportional to the instantaneous current in the circuit to be measured, and, although I have illustrated a preferred embodiment of my invention as being carried out by the employment of a pencil of cathode rays subjected to electrostatic influencing means, I do not limit myself to this means.

While I have shown and described my invention as applied to an instrument for the measurement of power, it may be used to trace the shape of an alternating wave by short circuiting or omitting the indication of the current velocity field. The pointer will then be influenced by an electrostatic field due to the electromotive force of the circuit, and the curve of voltage may be obtained from the indication of the pointer in the manner which I have described in my previous Patent, No. 834,998.

In the appended claims I seek to cover broadly the fundamental principle or method which I have invented, as well as the preferred apparatus which I employ for carrying out the same.

What I claim as new, and desire to secure by Letters Patent of the United States is,—

1. The method of obtaining an indication of power in an alternating current circuit which consists in obtaining an inclosed diagram the coördinates of which in one direction are proportional to the voltage in the circuit and the coördinates in another direction proportional to the quantity of electricity in the circuit.

2. The method of obtaining an indication of power in an alternating current circuit which consists in obtaining an inclosed diagram the coördinates of which in one direction are proportional to the voltage in the circuit and the coördinates in another direction at right angles to the first proportional to the quantity of electricity in the circuit.

3. The method of measuring power in an alternating current circuit which consists in obtaining an inclosed diagram the area of which is proportional to the power in the circuit one of the coördinates of said diagram being proportional to the voltage and the other coördinate proportional to the quantity of electricity in the circuit and by measurement of the area of the diagram computing the power in the circuit.

4. The method of measuring power in an alternating current circuit which consists in obtaining an inclosed diagram the area of which is proportional to the power in the circuit one of the coördinates of said diagram being proportional to the voltage in the circuit and the other coördinate at right angles to the first proportional to the quantity of electricity in the circuit and by measurement of the area of the diagram computing the power in the circuit.

5. The method of obtaining an indication of power in an alternating current circuit which consists in obtaining an inclosed diagram by means of an indicator which is adapted to be displaced in two directions at substantially right angles to each other, the displacement in one direction being proportional to the instantaneous voltage of the circuit and the velocity of displacement in the other direction being proportional to the instantaneous current in the circuit.

6. The method of measuring power in an alternating current circuit which consists in obtaining an inclosed diagram by means of an indicator which is adapted to be displaced in two directions, the displacement in one direction being proportional to the instantaneous voltage of the circuit and the velocity of displacement in the other direction being proportional to the instantaneous current in the circuit, and by measurement of the area of the diagram computing the power in the circuit.

7. The method of obtaining an indication of power in an alternating current circuit which consists in producing a pencil of cathode rays, causing said pencil of rays to be displaced in two directions, the displacement in one direction being proportional to the instantaneous voltage of the circuit and the velocity of displacement in the other direction being proportional to the instantaneous current in the circuit, and obtaining an indication of the path of said rays.

8. The method of measuring power in an alternating current circuit which consists in producing a pencil of cathode rays, causing said pencil of rays to be displaced in two directions, the displacement in one direction being proportional to the instantaneous voltage of the circuit and the velocity of displacement in the other direction being proportional to the instantaneous current in the circuit, obtaining an indication of the path of said rays, and by measurement of the area inclosed by said path computing the power of the circuit.

9. The method of obtaining an indication of power in an alternating current circuit which consists in producing a pencil of cathode rays, causing said pencil of rays to be displaced in two directions at substantially right angles to each other, the displacement in one direction being proportional to the instantaneous voltage of the circuit and the velocity of displacement in the other direction being proportional to the instantaneous current in the circuit, and obtaining an indication of the path of said rays.

10. The method of obtaining an indication of power in an alternating current circuit which consists in producing a pencil of cathode rays, subjecting said pencil of rays to two electrostatic influences adapted to displace the rays in two directions, the displacement of the rays in one direction being proportional to the instantaneous voltage of the circuit and the velocity of displacement of the rays in the other direction being proportional to the instantaneous current in the circuit, and obtaining an indication of the path of said rays.

11. The method of obtaining an indication of power in an alternating current circuit which consists in producing a pencil of cathode rays, subjecting said pencil of rays to the simultaneous action of two electrostatic fields, one field being proportional to the instantaneous voltage of the circuit and the second field proportional to the instantaneous current in the circuit, and obtaining an indication of the path of said rays.

12. The method of obtaining an indication of power in an alternating current circuit which consists in producing a pencil of cathode rays, subjecting said pencil of rays to an electrostatic field proportional to the instantaneous voltage of the circuit and to an electrostatic field acting at right angles to said first mentioned field and proportional to the instantaneous current in the circuit, and obtaining an indication of the path of said rays.

13. The method of obtaining an indication of power in an alternating current circuit which consists in producing a pencil of cathode rays, producing an electrostatic field proportional to the instantaneous voltage of the circuit, producing a second electrostatic field at substantially right angles to said first mentioned field and proportional to the instantaneous current in the circuit, subjecting said pencil of rays to the simultaneous action of both fields, and obtaining an indication of the path of said rays.

14. An apparatus for obtaining an indication of power in an alternating current circuit, comprising an indicator adapted to describe an inclosed diagram, means for displacing said indicator in two directions, the displacement in one direction being proportional to the instantaneous voltage of the circuit and the velocity of displacement in the other direction being proportional to the instantaneous current in the circuit, and means for obtaining a record of the path of said indicator.

15. An apparatus for obtaining an indication of power in an alternating current circuit, comprising means for producing a pencil of cathode rays, means for displacing said pencil of rays in two directions, the displacement in one direction being proportional to the instantaneous voltage of the circuit and the velocity of displacement in the other direction being proportional to the instantaneous current in the circuit, and means for obtaining an indication of the path of said displaced rays.

16. An apparatus for obtaining an indication of power in an alternating current circuit, comprising means for producing a pencil of cathode rays, means for displacing said pencil of rays in two directions at substantially right angles to each other, the displacement in one direction being proportional to the instantaneous voltage of the circuit and the velocity of displacement in the other direction being proportional to the instantaneous current in the circuit, and means for obtaining an indication of the path of said displaced rays.

17. An apparatus for obtaining an indication of power in an alternating current circuit, comprising means for producing a pencil of cathode rays, electrostatic fields for displacing said pencil of rays in two directions, said electrostatic fields being so arranged with respect to said pencil of rays that the displacement of the rays in one direction is proportional to the voltage of the circuit and the velocity of displacement in the other direction proportional to the instantaneous current in the circuit, and means for obtaining an indication of the path of said displaced rays.

18. An apparatus for obtaining an indication of power in an alternating current circuit, comprising means for producing a pencil of cathode rays, an electric circuit, a condenser connected in series with said circuit, an electrostatic device connected across said circuit and influencing said pencil of rays, a second electrostatic device connected across said condenser and placed at an angle to the first device and influencing said pencil of rays, and means for obtaining an indication of the path of said pencil of rays.

19. In combination with a vacuum tube and means for producing a pencil of rays therein, a screen which intercepts said pencil of rays, thereby causing a luminous spot to appear upon said screen, an electric circuit, a velocity condenser connected in series with said circuit, an electrostatic device connected across said circuit and influencing said pencil of rays, and a second electrostatic device connected across said condenser placed at an angle to the first device and influencing said pencil of rays.

20. In combination with a vacuum tube and means for producing a pencil of rays therein, a screen which intercepts said pencil of rays, thereby causing a luminous spot to appear upon said screen, an electric circuit, a condenser connected in series with said circuit, two electrostatic devices influencing said pencil of rays, and placed at an angle to each other, one device connected across the circuit and the other device connected across the condenser.

In witness whereof, I have hereunto set my hand this second day of November, 1910.

HARRIS J. RYAN.

Witnesses:
GEORGE A. CLARK,
F. B. WOOD.